July 22, 1941.  J. E. BANCROFT  2,250,174
PROJECTOR
Filed Aug. 16, 1939
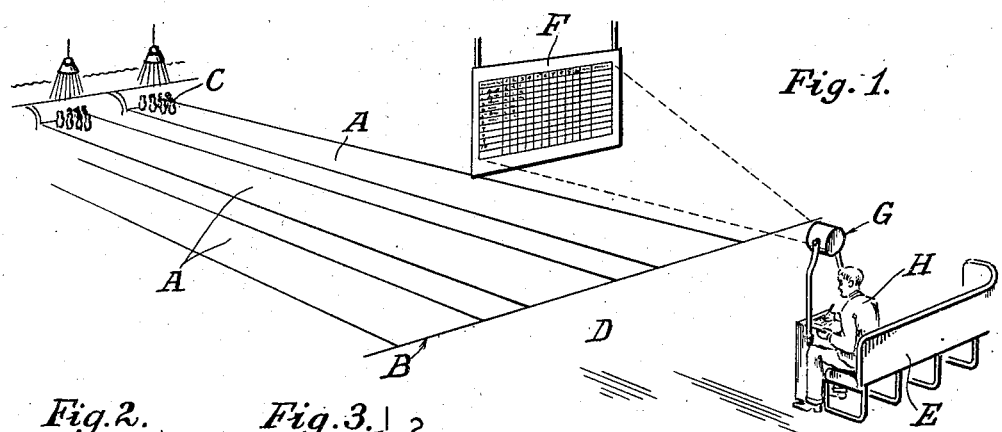
Fig. 1.
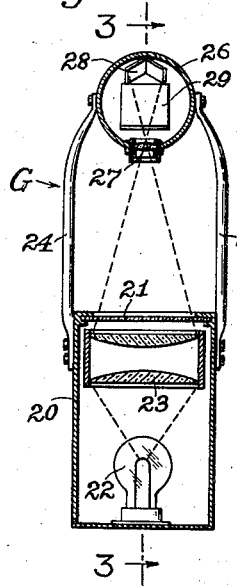
Fig. 2.
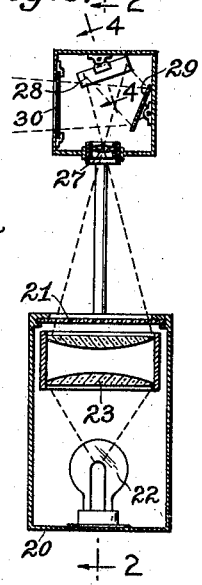
Fig. 3.
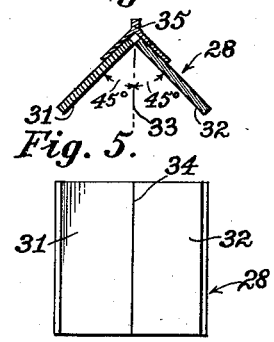
Fig. 4.
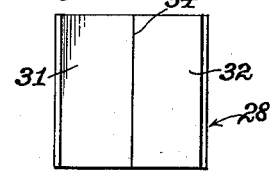
Fig. 5.
Fig. 6.
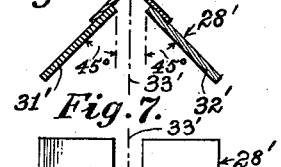
Fig. 7.
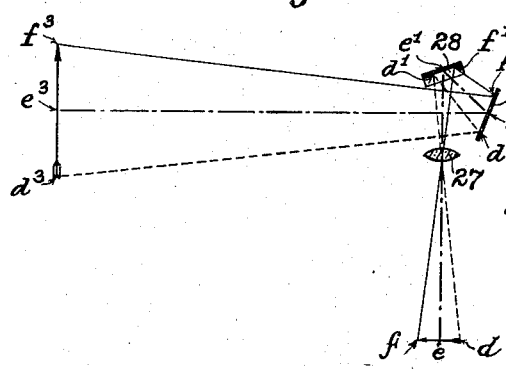
Fig. 10.
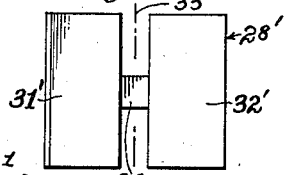
Fig. 8.
Fig. 9.
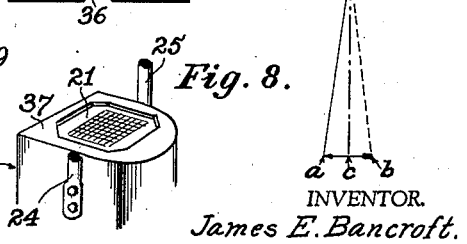
INVENTOR.
James E. Bancroft.
BY
Gluck & Breitenfeld
ATTORNEYS.

Patented July 22, 1941

2,250,174

UNITED STATES PATENT OFFICE 2,250,174

PROJECTOR

James E. Bancroft, Jamaica, N. Y., assignor to American Bowling and Billiard Corporation, New York, N. Y., a corporation of New York Application August 16, 1939, Serial No. 290,426

4 Claims. (Cl. 88—24)

My invention relates generally to projectors and more particularly to an arrangement in a projector for presenting to an observer an unchanged image of an object.

As my invention serves effectively for projecting scores in games such as bowling, I have illustrated in the drawing the embodiment of my invention in a projector for that purpose, and will describe my invention in connection with such an embodiment. It will be understood, however, that this is done only by way of exemplification as one of the practical applications of my invention and that my invention is not to be limited by such exemplifications, except to the extent called for by the language of the claims.

In the conventional bowling alley a scorer sits at the approach end of the alley facing in the direction of the pin end and records the scores on a pad that is right in front of him. Players and on-lookers keep themselves informed of the progress of the game by looking at this score pad, but when a crowd is lodged around the score pad, this becomes rather difficult because of the mulling around the score keeper.

One of the objects of my invention is an arrangement whereby the score keeper who writes the score, as well as the onlookers who want to look at what is written as well as to see the play, can have presented, in their line of vision as they view the play, on the score pad, an unchanged image on a larger scale. This general object I attain by an arrangement whereby inversions laterally and vertically are compensated for and balanced out, so that there is presented, in the line of vision of any observer, an uninverted and unreversed image, so that the observers can get a true picture of the score sheet as it is being recorded, and so that the score keeper, who makes the recordations, can check the accuracy of the recordations merely by watching the image of the recordation.

In the illustrated embodiment, I show the attainment of these objectives by employing in the optical system at least two mirrors symmetrically positioned in reference to the projected rays, and each of which will give a conventional reflection and which jointly give the result that each balances out of the other the reversal which a conventional mirror gives.

In accordance with the accomplishment of my general objectives by this arrangement, I have found it advisable that the mirrors be of the true 90° angled type, that is, that the planes of the reflecting surfaces meet at an angle of 90°, and, further, that the line along which they meet be symmetrically positioned with reference to the image forming rays.

These objects and such other objects as will hereinafter appear or be pointed out are attained in the illustrative embodiments of my invention shown in the drawing, in which:

Figure 1 is a view in perspective showing my projector in use on a bowling alley;

Figure 2 is a transverse sectional view through my improved projector taken substantially on the line 2—2 of Figure 3, looking in the direction of the arrows;

Figure 3 is a sectional view taken substantially on the line 3—3 of Figure 2 looking in the direction of the arrows;

Figure 4 is a sectional view of my improved reflector taken substantially on the line 4—4 of Figure 3, looking in the direction of the arrows;

Figure 5 is a face view of the reflector of Figure 4;

Figures 6 and 7 are respectively sectional and face views, similar to Figures 4 and 5, of a modified form of reflector;

Figure 8 is a view in perspective of the score keeping table, within which is held the master score sheet that constitutes the object an image of which is projected by my invention; and Figures 9 and 10 are diagrammatic views showing the optical principles of my invention, the former illustrative of the projection of horizontal linear object elements parallel to the projection screen, and the latter illustrative of the projection of horizontal linear object elements perpendicular to the screen.

In Figure 1 I have shown the application of my improved projector to a bowling alley. In this figure A designates the bowling alleys, B is the foul line and C is the pit end of the alleys, where the pins are set up. D is the space within which the players stand, while E designates seats provided for players. At F is shown a screen suitably supported, as by being hung from the ceiling, so that it does not obstruct the scorer's and the spectator's clear view of the bowling alley, and so that its surface is in full view of spectators looking down the alley to watch the play. At G I have shown my improved projector so positioned that the scorer H may take his position in front of it and look down the alley and observe what transpires in the alley. As the scorer observes the play he notes down the score on the table of the projector G, the construction of which will be more fully described hereinafter, and as he does so the projector throws the image of the score noted down by the scorer on the screen F, so that the score is visible to the spectators.

While I have illustrated by way of example, one particular position of my projector in relation to the alleys, it is to be understood that for particular purposes, other positions may be found more suitable.

In Figures 3 and 2, I have shown the arrangement of the parts of the projector G, and it will be observed that it comprises a lower casing or table 20, the upper end of which has in it a transparent or translucent plate 21. Inside the casing is shown a source of light such as the incandescent bulb 22; any bulb suitable for projection work, such as a bulb of the stereopticon or other concentrated filament type is to be preferred. The light from this bulb is thrown on the plate 21 by a condenser system 23 which may be adjustably mounted (not shown) for obvious reasons.

Two arms 24 and 25 are mounted on the casing 20 so as to extend upwardly therefrom and carry at their upper ends the projector system proper which is shown as comprising a casing 26 which may be mounted for pivotal movement (not shown) on the arms 24 and 25 so that the direction of the projected rays may be varied.

Within the casing 26 is mounted a projector lens system 27 which may be slidable in the casing 26 so that it may be properly focused, and this lens system 27 is adapted to receive rays from an object situated on the table 21 and to direct them first toward a reflector unit 28, of peculiar construction, from which the rays pass to a plane reflector 29 which throws them through a window 30 in the casing on the projector screen F.

The reflector unit 28 may be pivotally mounted, as shown, for purposes of adjustment, as will be obvious.

The construction of the reflector unit 28 is illustrated in detail in Figures 4 and 5. On referring to these figures it will be observed that it is shown as comprising two reflecting surfaces 31 and 32 positioned at substantially a right angle to each other and that the optical axis 33 of the projecting lens system 27 intersects their meeting edge 34. When in use in my projector the surfaces 31 and 32 are positioned symmetrically relatively to the axis 33, that is, the said axis lies in a plane that bisects the right angle between the surfaces 31 and 32 whereby said axis lies in a plane that forms an angle of 45° with each of said surfaces 31 and 32.

It will be understood that where I refer to the optical axis of the lens system that I do not thereby intend to limit myself to an axis that is necessarily rectilinear, but that I also include in said term an axis portions of which are redirected, as by reflection or by refraction, such as the axis shown in Figure 10 in which the broken line $e$—$e^1$—$e^2$—$e^3$ is the optical axis of the lens system.

The reflecting surfaces 31 and 32 are suitably supported by mounting them on a frame such as shown at 35 and they may be conveniently, although not necessarily, formed of two separate pieces held together by said supporting means 35, as indicated in Figure 4.

An alternative form of reflector unit, designated by the numeral 28', is shown in Figures 6 and 7. It comprises a pair of plane reflectors 31' and 32' disposed in spaced relation in planes at right angles to each other and suitably held in this position as by a frame 36.

Referring now to Figure 8, I have there shown in perspective the top 37 of the casing 20, and the plate or window 21 therein. The object which is to be projected is placed on the plate 21, and in accordance with the general principles of this type of projection, it must as a whole be transparent or translucent, so that light rays from the object may be picked up by the lens system 27 and transmitted to the screen.

While this desired result may be effected in various ways, I may mention two that I have found particularly effective in practice. According to one way the score card frame may be imprinted in some manner on a transparent sheet, such as a sheet of Celluloid or Cellophane, and the score recorded thereon by the scorer in some suitable manner, such as by ink or crayon. For projection purposes the score sheet is laid on the table 21, and after having served its purpose it may be removed and discarded, or, on the other hand, it may be filed away to serve as a permanent record. Obviously the surface of the transparent sheet may be matted, so as to render the sheet translucent instead of transparent. By imprinting the score frame in some permanent fashion and using ink, crayon or the like that may be erased, obviously the same score sheet may be used repeatedly, since by erasing the score marks, it will be available for a fresh score record.

It is also within my contemplation to make the plate 21, itself serve as a score card. In that case the score frame will be formed in some suitable or preferred manner directly on the plate 21 and the score is entered directly thereon in some medium that may be removed, so as to enable repeated use of the same plate. If desired, of course, an individual plate may be used for each score and the plates with their scores may be preserved. The plate 21 may obviously either be transparent or translucent.

For the optical principles underlying my invention I will now refer to Figures 9 and 10.

Figure 9 illustrates diagrammatically the projection, on the screen F, of an arrow $a$—$c$—$b$ positioned so as to lie transversely on the top 37 of the casing or table 20, its projection or image on said screen being designated by the letters $a^4$—$c^4$—$b^4$. The scorer is supposed to be sitting in front of the score table, as in Figure 1, so that he can look at the bowling alleys to watch the play and make entries of the score, and he will at the same time face the screen, as do also the spectators. The head $a$ and the tail $b$ of the arrow $a$—$c$—$b$ will be assumed to be equidistant from his eyes.

The diagram of Figure 9 is disposed in a plane. It is to be understood however that its lower portion is in reality at right angles to its upper portion, which change in angle is effected by the angular tilt of the reflectors 28 and 29, as shown in Figure 3, and diagrammatically in Figure 10. However the explanation of this phase of the optical principles is most conveniently and simply effected by means of a plane diagram such as that of Figure 9.

It will be assumed that the arrow is centrally positioned so that its mid-point $c$ is intersected by the optical axis of the lens system 27, and a ray proceeding from said point $c$ along said axis will follow said axis, striking the reflector 28 at a point $c^1$ the meeting point of its two lateral portions, from which it is reflected back to the mirror 29, which it strikes at a point $c^3$, to be reflected toward the screen F which it strikes at a point $c^4$, in other words it follows the optical axis, that is the line $c^1$—$c^2$—$c^3$—$c^4$.

A ray proceeding from the arrow head $a$ and passing through the optical center of the lens system 27, will strike the right portion of the reflector 28 at a point $a^1$, from which it will be reflected to a point $a^2$ on the left portion of the reflector 28, after which it will be reflected to a point $a^3$ on the reflector 29, from which it reaches the point $a^4$ on the screen F. It will be observed that the point $a$ of the object and the corresponding point $a^4$ of the screen image both lie on the same side of the optical axis. The inversion due to the lens system 27 has been corrected by a second inversion by the mirror 29.

The ray passing through the optical center of the lens 27 from the tail $b$ of the arrow passes through a series of reflections that corresponds to those undergone by the ray just traced. The successive points of reflection will be $b^1$, $b^2$, $b^3$, and the image point on the screen is $b^4$.

In Figure 10, the reflection in a vertical plane is featured diagrammatically. For simplicity of demonstration an arrow $d$—$e$—$f$, which lies in a plane containing the optical axis of the lens 27 and coincident with the plane of symmetry of the reflector 28 is selected as the object. However it will be obvious that the same principles apply to other arrows parallel to the arrow $d$—$e$—$f$.

Assuming that the arrow $d$—$e$—$f$ is centrally positioned, so that the optical axis of the lens system 27 pierces it at its mid-point $e$, such axial ray will strike reflector 28 at a point $e^1$, proceed to reflector 29, which it strikes at $e^2$, and will reach the screen F, which it strikes at the image point $e^3$.

A ray from the arrow tail, $d$, passing through the optical center of the lens system 27, will strike successively the reflector 28 at point $d^1$, the reflector 29 at $d^2$ and the screen F at the point $d^3$. Similarly a ray passing through the optical center of lens system 27 from the head $f$ of the arrow, will take the path $f^1$, $f^2$, $f^3$.

It will be observed that the point $a$ of the object, which is the point farthest removed from the scorer, becomes the highest point $a^3$ of the screen image.

It will now be clear that the projection has produced a true image, without inversion, in a vertical plane, of an object lying in a horizontal plane. Manifestly by adjustment of the reflector unit 28 and the mirror 29 the plane of the object may be varied from the horizontal, without departing from the principles explained and similarly the plane of the screen F may be varied from the vertical.

Manifestly, also, the same results may be secured where the elements 27, 28 and 29 are arranged in an optical sequence different from the one shown illustratively in the drawing.

The modified form of reflector 28' shown in Figures 6 and 7 is found to function in substantially the same way as the reflector 28 of Figures 4 and 5. It is found, however, that the space between the sections 31' and 32' causes a loss of light in the elements of the image parallel to the vertical plane containing the optical axis of the lens, that is the line $e$, $e^1$, $e^2$, $e^3$ and adjacent to said plane. If said space is made sufficiently great a gap is produced in the middle of the image and only the lateral halves of the image appear at both sides of said gap. It is therefore obvious that the said spacing must be regulated so as to avoid this gap.

While I have herein disclosed one illustrative embodiment of my invention and one modification thereof, it will be understood that the same may be embodied in many other forms and modified in many other ways without departing from the spirit thereof, as will be obvious to those skilled in the art, and that the disclosure herein is by way of illustration merely, and is not to be interpreted in a limiting sense, and that I do not limit myself other than as called for by the prior art.

Having thus described my invention and illustrated its use, what I claim as new and desire to secure by Letters Patent, is:

1. In combination in an installation for bowling alleys and the like, a vertical screen, and a projector comprising a casing, the upper end of said casing being light transmitting and having a substantially flat upper surface, a source of light in said casing, a condenser system adapted to collect light rays from said source and to illuminate the said upper surface of said casing, a second casing positioned above said first casing, a projecting lens system in said second casing adapted to receive rays from said illuminated upper surface of said first casing, reflecting means adapted to invert rays in relation to one transverse axis only, said means comprising a pair of plane reflecting surfaces disposed substantially at a right angle to each other, and disposed symmetrically in relation to the optical axis of the lens, and means for transmitting said rays from said reflecting means to said screen without further inversion.

2. In combination in an installation for bowling alleys and the like, a vertical screen, and a projector comprising a casing, the upper end of said casing being light transmitting and having a substantially flat upper surface, a source of light in said casing, a condenser system adapted to collect light rays from said source and to illuminate the said upper surface of said casing, a second casing positioned above said first casing, a projecting lens system in said second casing adapted to receive rays from said illuminated upper surface of said first casing, reflecting means adapted to invert rays in relation to one transverse axis only, said means comprising a pair of plane reflecting surfaces disposed substantially at a right angle to each other, and also disposed symmetrically in relation to the optical axis of the lens, and a single plane reflector adapted to receive the rays from said reflecting means and to direct them to said screen.

3. In a projector, in combination, a lens system, and means for inverting the image produced by said lens system relatively to a transverse axis, said means comprising a pair of plane light reflecting surfaces disposed substantially at a right angle to each other, with the axis of the lens system positioned in a plane bisecting the solid angle between said surfaces, and said surfaces being spaced from each other symmetrically relatively to said plane.

4. In combination in an installation for bowling alleys and the like, a screen, and a projector comprising a casing, the upper end of said casing being light transmitting and having a substantially flat upper surface, whereby a score keeper may position a translucent score card thereon on which he may enter the score while it is positioned on said upper surface, a source of light in said casing, a condenser system adapted to collect light rays from said source and to illuminate the said upper surface of said casing, a second casing positioned above said first casing, a projecting lens system in said second casing adapted to receive rays from said illuminated upper surface of said first casing, a reflecting unit in said second casing adapted to invert rays in relation to one transverse axis only, said unit comprising a pair of plane reflecting surfaces disposed substantially at a right angle to each other, and disposed symmetrically in relation to the optical axis of the lens system, and a plane reflector in said second casing positioned in the optical axis of the lens system, said lens system, said reflecting unit and said plane reflector constituting an optical system for transmitting an image of the score card to the screen.

JAMES E. BANCROFT.